United States Patent [19]

Higgins

[11] Patent Number: 4,647,484
[45] Date of Patent: Mar. 3, 1987

[54] CARPET UNDERLAY

[75] Inventor: Kenneth B. Higgins, LaGrange, Ga.

[73] Assignee: Milliken Research Corporation, Spatanburg, S.C.

[21] Appl. No.: 503,792

[22] Filed: Jun. 13, 1983

[51] Int. Cl.⁴ .............................................. B32B 3/00
[52] U.S. Cl. .................................... 428/40; 428/95; 428/247; 428/250; 428/251
[58] Field of Search ............... 428/40, 95, 247, 250, 428/251

[56] References Cited

U.S. PATENT DOCUMENTS

| | | | |
|---|---|---|---|
| 1,594,261 | 7/1926 | Herschmann | 428/95 |
| 3,014,829 | 12/1961 | Curtin | 154/49 |
| 3,039,907 | 6/1962 | Scholl | 154/53.5 |
| 3,311,338 | 3/1967 | Culley | 248/205 |
| 4,010,302 | 3/1977 | Anderson et al. | 428/95 |
| 4,075,377 | 2/1978 | Aitchison et al. | 428/95 |
| 4,172,917 | 10/1979 | Angelle et al. | 428/95 |
| 4,242,394 | 12/1980 | Leib et al. | 428/95 |

Primary Examiner—Marion C. McCamish
Attorney, Agent, or Firm—Earle R. Marden; H. William Petry

[57] ABSTRACT

An underlay for carpets and especially carpet tiles having a scrim supported, lower foam rubber portion and a Mylar upper portion having adhesive on both sides to provide an attachment to the lower portion and an adhesive upper portion for attachment to a carpet tile. The upper adhesive layer is protected by a release paper which is removed to install carpet tiles thereon. An alternate form of the invention eliminates the use of the scrim layer and the bottom layer of adhesive.

11 Claims, 4 Drawing Figures

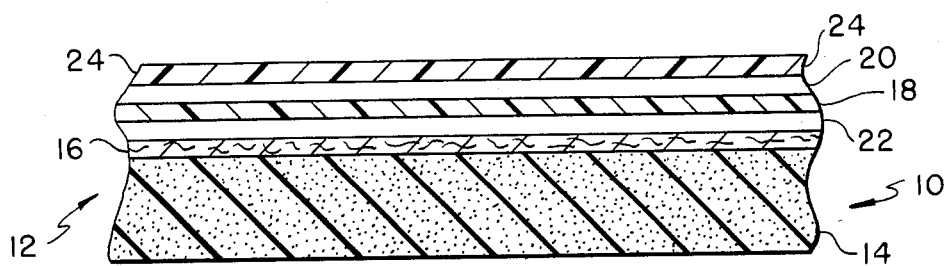
FIG.-1-
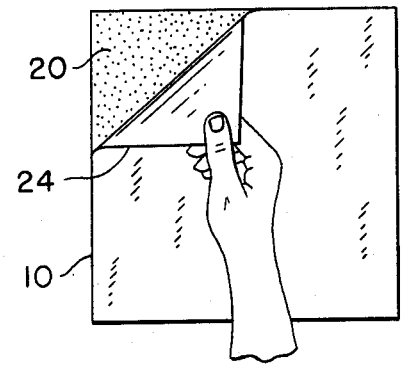
FIG.-2-
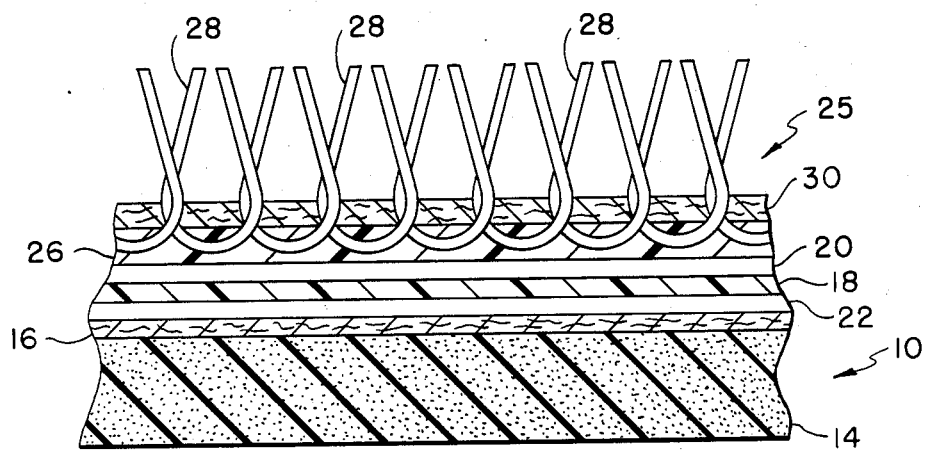
FIG.-3-
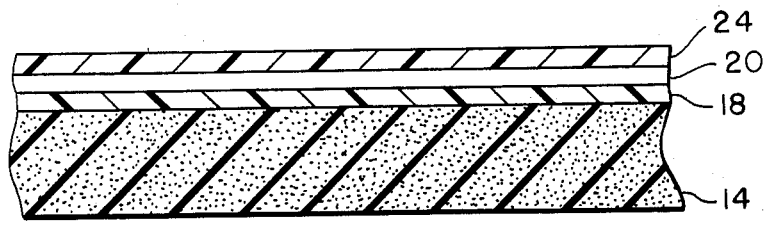
FIG.-4-

CARPET UNDERLAY,

This invention relates to an underlay for carpets which is laid without the use of adhesive on the surface to be carpeted and at the same time is strong with elongation and dimensional stability. In particular, the underlay comprises a layer of rubber material with a layer of scrim material on top and having a layer of adhesive on top of the scrim material. On top of the layer of adhesive is a polymeric film on top of which is another layer of adhesive to which a release paper is mounted on.

It is therefore an object of the invention to provide a freelay carpet underlay which allows ease of installation of carpet thereon.

Other objects of the invention will become readily apparent as the specification proceeds to describe the invention with reference to the accompanying drawings, in which:

FIG. 1 is a cross-sectional view of the new and improved carpet underlay;

FIG. 2 is a top view showing the release paper on the top of the underlay being recommended;

FIG. 3 is a cross-sectional view of the carpet underlay adhered to a carpet; and FIG. 4 is a modification of FIGS. 1-3.

The carpet underlay 10 of FIG. 1 is preferably cut to a pre-determined size for use under individual carpet tiles, but obviously can be cut in larger sections and be employed with broadloom or throw rug sizes, if desired. The carpet underlay 10 is made in two sections and then combined to form the product of FIG. 1. The lower section of the underlay 10 consists of a cushion 12 of a combination of natural and synthetic vulcanized rubber materials 14 foamed onto a glass scrim 16. The scrim fabric 16 is like produced on the scrim disclosed in U.S. Pat. No. 3,646,411 and consists of a top and bottom sheet of warp yarns connected to a plurality of fill yarns extending perpendicular to and between the two sheets of warp yarns. The foamed cushion layer of rubber material 14, in an amount approximately equal to 80 oz./sq. yard is allowed to set in combination with the scrim 16 which acts as a carrier fabric as well as providing dimensional stability to the cushion 14.

In a separate operation, a double faced tape or upper portion is produced in 60" width using 1 mil polymeric polyethylene terephthalate film such as MYLAR film 18 as the carrier and 1½ mils each side of a special pressure sensitive adhesive 20 and 22 which are compatible with PVC (since carpet tiles are mainly PVC in nature). The pressure sensitive adhesive is special in the sense that it is compatible with PVC and can be of any commercially available type. Then a double sided release paper 24 is applied to allow tape to be rolled up. The MYLAR film 18 is the main ingredient of the above tape since the MYLAR is a very stable material in all directions and if it is stretched its recovery is almost 100%. This film makes the whole composition stable and prevents the underlay from stretching between the tiles and will lay flat on the floor under all conditions. It is important to notice that the underlay is free-layed to the floor and not glued, therefore can be removed at any time without damage. MYLAR also is a very good smooth surface for adhesive application.

The final step is the marriage of the two above components into one underlay for modular products by bringing the upper portion and lower portion together so that the adhesive layer 22 binds the portions together.

To install a carpet of either broadloom or carpet tiles, the underlay 10 is layed on the floor loose, no adhesive, and the release paper 24 removed, as shown in FIG. 2, when the underlay portions are properly located. Then, as indicated in FIG. 3, the carpet 25 is placed onto the underlay with the hardback backing 26 of the carpet 25 into contact the exposed adhesive layer 20 to hold the carpet in desired position with the tufts 28 projecting upwardly from the backing material 30.

FIG. 4 is a modification of the carpet underlay shown in FIGS. 1-3. In the modification of FIG. 4, the foam rubber material 14 is foamed directly onto the MYLAR film 18. Then the adhesive layer 20 and the release paper 20 are applied as in FIGS. 1-3 to form the underlay structure of FIG. 4. The underlay 12 is employed in the same manner as disclosed with reference to the underlay of FIG. 1.

It is obvious that the herein disclosed underlay, due to its resilience, provides comfort and improved carpet wear. Furthermore, the combined underlay will tend to reduce noise level as well as provide the look and feel of luxury.

Although the preferred embodiments have been described in detail, it is contemplated that changes may be made without departing from the scope or spirit of the invention and I desire to be limited only by the claims.

I claim:

1. An underlay for a carpet comprising: a layer of rubber material, a layer of scrim on top of said rubber material, a first layer of adhesive on top of said scrim material, a polymeric film on top of said first layer of adhesive, a second layer of adhesive on top of said film and a release paper mounted on top of said second layer of adhesive.

2. The underlay of claim 1 wherein said scrim is glass.

3. The underlay of claim 1 wherein said polymeric film is a polyethylene terephthalate material.

4. An underlay for a carpet comprising: a layer of rubber material, a polymeric film adhered to the top of said layer of rubber material, a layer of adhesive on top of said film and a release paper mounted on top of said layer of adhesive.

5. The underlay of claim 4 wherein said polymeric film is a polyethylene terephthalate material.

6. A carpet structure for a floor comprising: a layer of rubber material, a layer of scrim on top of said rubber material, a first layer of adhesive on top of said scrim material, a polymeric film on top of said first layer of adhesive, a second layer of adhesive on top of said film and a carpet mounted on top of said second adhesive layer and being connected thereto.

7. The carpet structure of claim 6 wherein said polymeric film is a polyethylene terephthalate.

8. The carpet structure of claim 6 wherein said scrim is glass.

9. The carpet structure of claim 8 wherein said polymeric film is a polyethylene terephthalate.

10. A carpet structure for a floor comprising: a layer of rubber material, a polymeric film adhered to the top of said layer of rubber material, a layer of adhesive on top of said film and a carpet mounted on top of said adhesive layer and being connected thereto.

11. The carpet structure of claim 10 wherein said polymeric film is a polyethylene terephthalate.

* * * * *